April 5, 1955

J. BOURSEAU ET AL 2,705,744

APPARATUS FOR MEASURING THE REGULARITY OF
THE IMPEDANCE OF TELECOMMUNICATION CABLES

Filed July 1, 1952

INVENTOR.
Jean Bourseau
Georges Comte
BY

Michael S. Striker
agt.

April 5, 1955

J. BOURSEAU ET AL 2,705,744

APPARATUS FOR MEASURING THE REGULARITY OF
THE IMPEDANCE OF TELECOMMUNICATION CABLES

Filed July 1, 1952

INVENTORS
Jean Bourseau
Georges Comte
BY
Michael S. Striker
agt.

United States Patent Office 2,705,744
Patented Apr. 5, 1955

2,705,744

APPARATUS FOR MEASURING THE REGULARITY OF THE IMPEDANCE OF TELECOMMUNICATION CABLES

Jean Bourseau and Georges Comte, Lyon, France, assignors to Compagnie Generale d'Electricite, Paris, France, a French corporation Application July 1, 1952, Serial No. 296,698

7 Claims. (Cl. 179—175.3)

The object of the present invention is an apparatus for measuring the regularity of the impedances of telecommunication cables, using a signal known under the designation of "unit" signal.

Pulse type apparatus, is used, at the present time, for effecting measurements of this kind.

In such an apparatus, a generator sends out, at the entrance of the cable under test a series of pulses, each one of which having a very steep leading or rising edge and a very steep trailing or decreasing edge, separated by an interval which is very short with respect to the repetition period of the pulses; this repetition period, however, is chosen longer than the time necessary for the transmission of the pulse to the far end of the cable and back, after reflection, to the entrance thereto; a hybrid device, consisting of a bridge or a hybrid transformer applies the pulse both to the cable under test and to a network the impedance of which is so adjusted as to reproduce the input impedance which the cable would offer if it were entirely free of faults; there is thus obtained, at the output from this hybrid device, an echo voltage caused by the successive reflections of the pulse on the various obstacles it meets when travelling on the cable.

It is generally assumed that the echo voltage caused by an obstacle located at a point at a distance $x$ from the cable entrance is proportional to the derivative of the characteristic impedance $Z_x$ of the cable at that point, with respect to the time of transmission of the voltage up to said point, or which amounts to the same thing, to the derivative of this characteristic impedance with respect to the abscissa $x$ of said point.

This derivative $$\frac{dZ(x)}{dx}$$

characterises the reflection factor of the cable and makes it possible to know what the quality of transmission over the cable will be.

It would be interesting, however, to know, first of all, the local characteristic impedance $Z(x)$ at any point along the cable rather than its derivative $$\frac{dZ(x)}{dx}$$

since it is the regularity of this local impedance which has the main effect on the quality of transmission.

Thus an apparatus giving directly, by a measurement in a transient state, the diagram of the local impedance of a cable at all points of said cable would be much more useful than the pulse type instruments used at present. In addition the apparatus in accordance with the present invention offers the advantage of giving results which could be checked directly against those obtained by steady state methods of measurement. Steady state measuring methods involve all the known techniques which, however, are nevertheless useful as a means of checking, whereas the data obtained by pulse type instruments cannot, at present, be checked by any other method.

Since the exploring of a cable by means of pulses gives information on the mathematical derivative $$\frac{dZ(x)}{dx}$$

of the local impedance $Z(x)$, it will be seen that a device giving directly the local impedance $Z(x)$ should call for a signal the mathematical form of which is the integral of a pulse, i. e. a so-called "unit" signal.

The object of the present invention is an instrument utilizing a unit signal for a direct determination of $Z(x)$.

Such a measuring instrument, using a unit signal, for the measurement of impedance irregularities in cables is related, by its constitution, with the already known measuring instruments designated ordinarily under the name of "pulse type echo-meters."

A pulse type echo-meter of a known type comprises the following elements which are shown diagrammatically on the attached Figure 1; a generator, generating a transient signal, with a periodic repetition 1, a hybrid transformer 2 which may be replaced by a balanced measuring bridge and which comprises two secondary windings 3 and 4; the winding 3 is connected with the cable under test 13 and the winding 4 is connected with a balancing network 5 the input impedance of which is identical with that of the cable 13, if assumed to be faultless; an amplifier 6 which collects the unbalance voltages caused by echoes on the irregularities in the cable, raises their levels and applies them to the vertical deflection plates of a cathode ray tube 7, the horizontal deflection plates of which receive a voltage which is proportional to time, but offering periodic returns to its original value and which is supplied by a time base generator 10. The far end of the cable 13 is further connected with a balancing network 8 similar to the balancing network 5.

In each a pulse type echo-meter, the transient exploring signal consists of a pulse having a very short duration.

Contrary to the use of pulses having a very short time duration, for exploring signals, in the instrument which is an object of the invention, this exploring signal has a wave form which exhibits a sudden voltage jump from a certain value $U_1$ to a certain value $U_2$, followed by a relatively long period during which the voltage preserves the value $U_2$.

This instrument thus differs from echo-meters of known types by means making it possible to obtain sudden voltage jumps without, however, giving a voltage having increasing values for successive steps thereof; the effect of these means is to bring back the pulse voltage from the value $U_2$ to the starting value $U_1$, after a time $\tau_2$, definitely longer than the time taken by the current to make a return trip on the cable under test. Thus, at the end of this time $\tau_2$ the disturbance resulting from the application to the cable of the voltage jump from $U_1$ to $U_2$ is completely damped.

The instrument according to the invention comprises further a device 9 which masks or blanks, on the cathode ray tube, phenomena produced during the fraction of a period which corresponds to the return of the voltage from the value $U_2$ to its initial value $U_1$, and therefore the effects of these phenomena on the cable; this erasing effect is maintained for a sufficient time for all these effects to remain invisible, so that at the end of a time $\tau'$, a new jump from $U_1$ to $U_2$ can take place without mixing its effects with those of the previous jump in the same direction or of the return jump which follows in the opposite direction. The time base system supplying the cathode ray oscillograph is adjusted so that all the voltage jumps from $U_1$ to $U_2$ give images which are superposed on the screen of the tube; there is thus obtained on this screen the cable response curve to a sudden voltage jump from $U_1$ to $U_2$, i. e. to the unit signal which is to be used for the measurement.

By way of non limitative example, the above mentioned means comprise:

1. A generator 11 supplying a periodic signal, the successive half periods of which have durations $\tau$ and $\tau'$ respectively; the times $\tau$ and $\tau'$ both being definitely longer than the duration of a two-way travel of the current on the maximum length of the cable to be explored. The times $\tau$ and $\tau'$ may be equal; the signal is then sinusoidal.

2. A peak limiting device 12 which transforms the above signal into an approximately square signal with a repetition period $\tau + \tau'$ this signal passes, in a very short time from a value $U_1$ to a value $U_2$, remains at the value $U_2$ during the time $\tau$, then comes back, within a very short time also, from $U_2$ to $U_1$, remains at $U_1$ during the time $\tau'$ and the cycle is repeated; the passings from one to the other value always being effected in a very short time as compared to the duration of the period, as short as the circuit time constants will allow; this peak limiting device may comprise, for instance, cross connected diodes or saturated pentodes.

3. A device 9 generates an output voltage which insures the extinction of the spot of the oscillograph for the time $\tau'$ during which the voltage is maintained at the value $U_1$; this device applies to the focus electrode of the cathode tube a square wave shaped voltage having a period $\tau+\tau'$ with an amplitude and phase so selected that said voltage prevents beam current flow in the cathode ray oscillograph during the time. To this effect, said device is supplied with the signal produced by the generator 11 and includes known means for phase shifting said signal then clipping it so as to give it a square shape.

Figure 1:
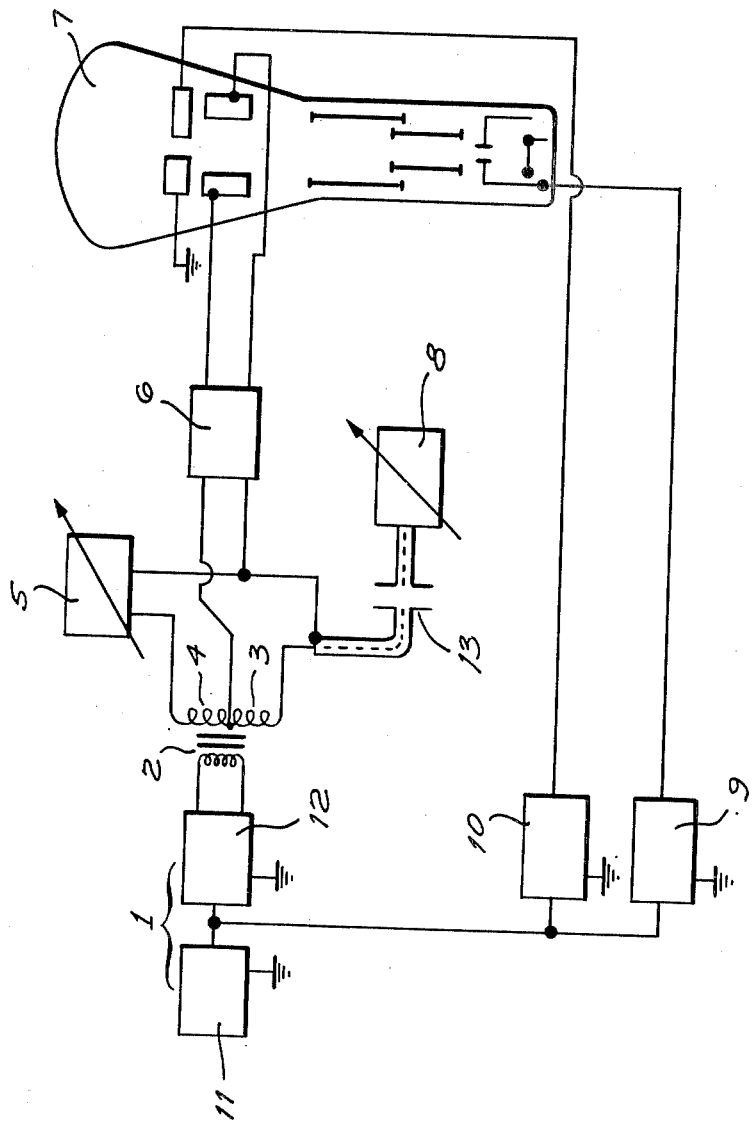
Figure 2:
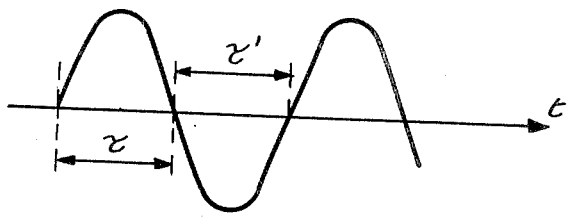
Figure 2 is a diagram showing the variation, versus time, of the periodic wave supplied by the generator 11 before the application of said wave to the peak limiting device 12.
Figure 3:
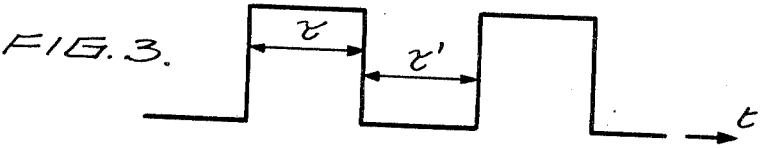
Figure 3 is a diagram showing the clipped wave at the output of the peak limiting device 12.
Figure 4:
Figure 4 shows the same wave, the return time of which is masked by the erasing device 9.
Figure 5:
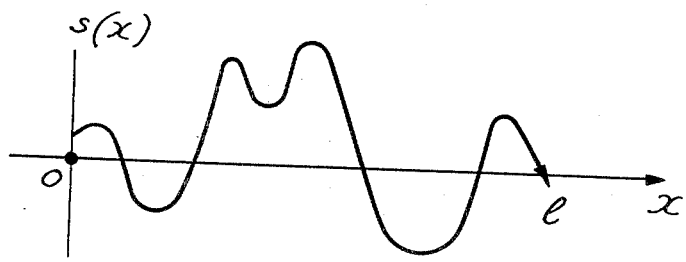

Finally, Figure 5 shows an example of an impedance variation curve versus the distance from one end of the cable under test.

What is claimed is:

1. A system for testing successive impedance irregularities along a signalling transmission line comprising in combination, a source of alternating current waves of predetermined frequency; peak limiting means for limiting the amplitude of said alternating current waves so as to translate said alternating current waves into substantially rectangularly shaped waves having leading and lagging edges of short rise and decay times, respectively, said rectangular shaped waves having a relatively long time duration; means comprising a four terminal transformer coupled network, one of said terminals of said transformer coupled network being electrically connected to the output of said peak limiting means, a second terminal of said transformer coupled network being adapted to be connected to a suitably terminated cable whose impedance irregularities are to be determined along the length thereof, a third terminal of said transformer coupled network being adapted to be connected to an impedance matching network, the fourth terminal of said transformer coupled network having an output voltage developed thereacross, said output voltage being substantially zero when the impedances of said cable and said impedance matching network connected to said second and third terminals respectively are equal, said fourth terminal being effectively coupled to said first terminal when the impedances of said cable and said matching network connected to said second and third terminals respectively are mismatched, the degree of coupling, and therefore the amplitude of the output voltage, being proportional to the degree of impedance mismatch; and means connected to said fourth terminal for indicating the degree of impedance mismatch between the impedances of said cable and said matching network connected to said second and third terminals respectively of said four terminal transformer coupled network.

2. A system for testing successive impedance irregularities along a signalling transmission line comprising in combination, a source of alternating current waves of predetermined frequency; peak limiting means for limiting the amplitude of said alternating current waves so as to translate said alternating current waves into substantially rectangularly shaped waves having leading and lagging edges of short rise and decay times, respectively, said rectangular shaped waves having a time duration substantially equal to one half the time interval between leading edges of said rectangular shaped waves; an impedance matching network; an impedance bridge having four arms, the first and second arms of said impedance bridge each comprising one half of a center tapped secondary winding of a transformer, the third and fourth arms of said bridge comprising respectively, a cable whose impedance irregularities are to be determined and said impedance matching network, said third and fourth arms being connected in series and having the free terminals thereof connected to the free terminals of said first and second arms, the primary winding of said transformer constituting the input to said impedance bridge, said primary winding being connected to the output of said peak limiting means, the output of said impedance bridge being developed between the center tap of said secondary winding and the common junction between said third and fourth arms connected in series; and means connected to the output of said impedance bridge for indicating impedance irregularities of said cable.

3. A system for testing successive impedance irregularities along a signalling transmission line comprising in combination, a source of alternating current waves of predetermined frequency; peak limiting means for limiting the amplitude of said alternating current waves so as to translate said alternating current waves into substantially rectangularly shaped waves having leading and lagging edges of short rise and decay times, respectively, said rectangular shaped waves having a time duration substantially equal to one half the time interval between leading edges of said rectangular shaped waves; an impedance matching network; a two terminal impedance matching network; a hybrid transformer having a primary and a center tapped secondary winding, said primary winding being connected to the output of said peak limiter, one end terminal of said center tapped secondary winding being connected in series with said two terminal impedance matching network, the other end terminal of said center tapped secondary winding being adapted to be connected to the near end of one of the two conductors of a suitably terminated cable whose impedance irregularities are to be determined, the other conductor of said cable being adapted to be connected with the free terminal of said impedance matching network, the output of said hybrid transformer being developed between the center tap of said secondary winding and the connection between said other conductor of said cable adapted to be connected to said free terminal of said impedance matching network; and indicating means connected to the output of said hybrid transformer for indicating the impedance irregularities of said cable.

4. A system for testing successive impedance irregularities along a signalling transmission line comprising in combination, a source of alternating current waves of predetermined frequency; first peak limiting means for limiting the amplitude of said alternating current waves so as to translate said alternating current waves into substantially rectangularly shaped waves having leading and lagging edges of short rise and decay times, respectively, said rectangular shaped waves having a time duration substantially equal to one half the time interval between leading edges of said rectangular shaped waves; an impedance matching network; a two terminal impedance matching network; a hybrid transformer having a primary and a center tapped secondary winding, said primary winding being connected to the output of said peak limiter, one end terminal of said center tapped secondary winding being connected in series with said two terminal impedance matching network, the other end terminal of said center tapped secondary winding being adapted to be connected to the near end of one of the two conductors of a suitably terminated cable whose impedance irregularities are to be determined, the other conductor of said cable being adapted to be connected with the free terminal of said impedance matching network, the output of said hybrid transformer being developed between the center tap of said secondary winding and the connection between said other conductor of said cable adapted to be connected to said free terminal of said impedance matching network; a cathode ray tube having a focus electrode, and horizontal and vertical deflecting plates for deflecting an electron beam impinging on the screen of said cathode ray tube, one of said deflecting plates being connected to the output of said hybrid transformer for sweeping said electron beam in a first direction; means connected to the other of said deflecting plates for sweeping said electron beam in a second direction; second peak limiting means connected at its input terminals to the output of said source of alternating current waves of predetermined frequency, said second peak limiting means translating said alternating current waves into substantially rectangularly shaped waves having leading and lagging edges of short rise and decay times respectively, said rectangular shaped waves having a time duration substantially equal to one half the time interval between leading edges of said rectangular waves, said second peak limiting means having an output voltage at a predetermined phase across its output terminals connected to said focus electrode of said cathode ray tube so that the effect of the collapse of the lagging edges of the rectangular shaped waves on the cable adapted to be connected with the free terminal of said impedance matching network will not be noticeable on the pattern traced on the screen of said cathode ray tube.

5. A system for testing successive impedance irregularities along a signalling transmission line comprising in combination, a source of alternating current waves of predetermined frequency; first peak limiting means for limiting the amplitude of said alternating current waves so as to translate said alternating current waves into substantially rectangularly shaped waves having leading and lagging edges of short rise and decay times, respectively, said rectangular shaped waves having a time duration substantialy equal to one half the time interval between leading edges of said rectangular shaped waves; an impedance matching network; a two terminal impedance matching network; a hybrid transformer having a primary and a center tapped secondary winding, said primary winding being connected to the output of said peak limiter, one end terminal of said center tapped secondary winding being connected in series with said two terminal impedance matching network, the other end terminal of said center tapped secondary winding being adapted to be connected to the near end of one of the two conductors of a suitably terminated cable whose impedance irregularities are to be determined, the other conductor of said cable being adapted to be connected with the free terminal of said impedance matching network, the output of said hybrid transformer being developed between the center tap of said secondary winding and the connection between said other conductor of said cable adapted to be connected to said free terminal of said impedance matching network; a cathode ray tube having a focus electrode, and deflecting means for deflecting an electron beam in a first and second direction, respectively, one of said deflecting means being connected to the output of said hybrid transformer for sweeping said electron beam in said first direction; sweep generator means connected to the other of said deflecting means for sweeping said electron beam in said second direction; second peak limiting means connected at its input terminals to the output of said source of alternating current waves of predetermined frequency, said second peak limiting means translating said alternating current waves into substantially rectangularly shaped waves having leading and lagging edges of short rise and decay times respectively, said rectangular shaped waves having a time duration substantially equal to one half the time interval between leading edges of said rectangular waves, said second peak limiting means having an output voltage at a predetermined phase across its output terminals connected to said focus electrode of said cathode ray tube so that the effect of the collapse of the lagging edges of the rectangular shaped waves on the cable adapted to be connected with the free terminal of said impedance matching network will not be noticeable on the pattern traced on the screen of said cathode ray tube.

6. A system for testing successive impedance irregularities along a signalling transmission line comprising in combination, a source of alternating current waves of predetermined frequency; first peak limiting means for limiting the amplitude of said alternating current waves so as to translate said alternating current waves into substantially rectangularly shaped waves having leading and lagging edges of short rise and decay times, respectively, said rectangular shaped waves having a time duration substantially equal to one half the time interval between leading edges of said rectangular shaped waves; an impedance matching network; an impedance bridge having four arms, the first and second arms of said impedance bridge each comprising one half of a center tapped secondary winding of a transformer, the third and fourth arms of said bridge comprising respectively, a cable whose impedance irregularities are to be determined and said impedance matching network, said third and fourth arms being connected in series and having the free terminals thereof connected to the free terminals of said first and second arms, the primary winding of said transformer constituting the input to said impedance bridge, said primary winding being connected to the output of said peak limiting means, the output of said impedance bridge being developed between the center tap of said secondary winding and the common junction between said third and fourth arms connected in series; a cathode ray tube having a focus electrode, and deflecting means for deflecting an electron beam in a first and second direction, respectively, one of said deflecting means being connected to the output of said impedance bridge for sweeping said electron beam in said first direction; sweep generator means connected to the other of said deflecting means for sweeping said electron beam in said second direction; second peak limiting means connected at its input terminals to the output of said source of alternating current waves of predetermined frequency, said second peak limiting means translating said alternating current waves into substantially rectangularly shaped waves having leading and lagging edges of short rise and decay times respectively, said rectangular shaped waves having a time duration substantially equal to one half the time interval between leading edges of said rectangular waves, said second peak limiting means having an output voltage at a predetermined phase across its output terminals connected to said focus electrode of said cathode ray tube so that the effect of the collapse of the lagging edges of the rectangular shaped waves on the cable adapted to be connected with the free terminal of said impedance matching network will not be noticeable on the pattern traced on the screen of said cathode ray tube.

7. A system for testing successive impedance irregularities along a signalling transmission line comprising in combination, a source of alternating current waves of predetermined frequency; first peak limiting means for limiting the amplitude of said alternating current waves so as to translate said alternating current waves into substantially rectangularly shaped waves having leading and lagging edges of short rise and decay times, respectively, said rectangular shaped waves having a time duration substantially equal to one-half the time interval between leading edges of said rectangular shaped waves; an impedance matching network; an impedance bridge having four arms, the first and second arms of said impedance bridge each comprising one-half of a center tapped secondary winding of a transformer, the third and fourth arms of said bridge comprising respectively, a cable whose impedance irregularities are to be determined and said impedance matching network, said third and fourth arms being connected in series and having the free terminals thereof connected to the free terminals of said first and second arms, the primary winding of said transformer constituting the input to said impedance bridge, said primary winding being connected to the output of said peak limiting means, the output of said impedance bridge being developed between the center tap of said secondary winding and the common junction between said third and fourth arms connected in series; a cathode ray tube having a focus electrode, and horizontal and vertical deflecting plates for deflecting an electron beam impinging on the screen of said cathode ray tubes, one of said deflecting plates being connected to the output of said hybrid transformer for sweeping said electron beam in a first direction; means connected to the other of said deflecting plates for sweeping said electron beam in a second direction; second peak limiting means connected at its input terminals to the output of said source of alternating current waves of predetermined frequency, said second peak limiting means translating said alternating current waves into substantially rectangularly shaped waves having leading and lagging edges of short rise and decay times respectively, said rectangular shaped waves having a time duration substantially equal to one-half the time interval between leading edges of said rectangular waves, said second peak limiting means having an output voltage at a predetermined phase across its output terminals connected to said focus electrode of said cathode ray tube so that the effect of the collapse of the lagging edges of the rectangular shaped waves on the cable adapted to be connected with the free terminal of said impedance matching network will not be noticeable on the pattern traced on the screen of said cathode ray tube.

References Cited in the file of this patent

UNITED STATES PATENTS

| | | |
|---|---|---|
| 2,249,164 | Olson | July 15, 1941 |
| 2,345,932 | Gould | Apr. 4, 1944 |